(12) United States Patent
Kobayashi et al.

(10) Patent No.: US 7,510,235 B2
(45) Date of Patent: Mar. 31, 2009

(54) BODY COVER STRUCTURE FOR SEAT TYPE VEHICLE

(75) Inventors: Takeshi Kobayashi, Saitama (JP); Yukinori Kawaguchi, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 40 days.

(21) Appl. No.: 11/730,109

(22) Filed: Mar. 29, 2007

(65) Prior Publication Data
US 2007/0236037 A1    Oct. 11, 2007

(30) Foreign Application Priority Data
Mar. 31, 2006    (JP)    ............... 2006-096578

(51) Int. Cl.
  *B62D 25/00*    (2006.01)
  *B62D 25/20*    (2006.01)
(52) U.S. Cl. ............... 296/193.01; 296/193.07; 296/181.2; 296/75
(58) Field of Classification Search ............... 296/181.2, 296/75, 193.01, 193.03, 193.04, 193.07
See application file for complete search history.

(56) References Cited

U.S. PATENT DOCUMENTS

| | | | | |
|---|---|---|---|---|
| 4,521,049 A | * | 6/1985 | Genma et al. ............ | 296/181.2 |
| 5,688,021 A | * | 11/1997 | Tomforde et al. ......... | 296/203.01 |
| 6,460,918 B1 | * | 10/2002 | Sato et al. .................... | 296/204 |
| 6,688,676 B1 | * | 2/2004 | Sato ........................ | 296/187.05 |
| 7,011,359 B2 | * | 3/2006 | Watanabe et al. ......... | 296/187.08 |
| 7,025,412 B2 | * | 4/2006 | Nakamura et al. ......... | 296/193.07 |
| 7,287,797 B1 | * | 10/2007 | Belloso ...................... | 296/35.1 |
| 7,422,082 B2 | * | 9/2008 | Reffitt ........................ | 180/90.6 |
| 2002/0096904 A1 | * | 7/2002 | Matsushita .................. | 296/75 |

FOREIGN PATENT DOCUMENTS

JP    6-34213 A    9/1994

* cited by examiner

*Primary Examiner*—Dennis H Pedder
(74) *Attorney, Agent, or Firm*—Birch, Stewart, Kolasch & Birch, LLP (57) ABSTRACT

A body cover structure for a seat type vehicle provides a non-slip portion that can be formed integrally on a floor surface located between the tire housings. In a body cover structure for a seat type vehicle in which a body cover made of resin that covers a body frame is split into a front cover, a center cover, and a rear cover, and in which tire housings are formed in the front cover, a floor panel portion extends between tire housings and is formed integrally in the center cover. Non-slip portions are integrally formed on the floor surface of the floor panel portion.

20 Claims, 12 Drawing Sheets

BODY COVER STRUCTURE FOR SEAT TYPE VEHICLE

CROSS-REFERENCE TO RELATED APPLICATIONS

The present application claims priority under 35 USC 119 to Japanese Patent Application No. 2006-096578 filed on Mar. 31, 2006 the entire contents of which are hereby incorporated by reference.

BACKGROUND OF THE INVENTION

1. Field of the Invention

The present invention relates to a body cover structure for a seat type vehicle that is formed so as to include tire housings located on the left and right front sides of a cab.

2. Description of Background Art

A MUV (Multi Utility Vehicle) vehicle is commonly known as a seat type vehicle capable of driving over rough terrain places or the like. A vehicle of this type is equipped with a body cover constituting the front lower portion and side portions of a cab. The body cover includes a front cover having left and right tire housings, a center cover extending rearward from a lower portion of the front cover, and a rear cover constituting a portion on the further rear side from the front cover and the center cover.

The above-mentioned center cover includes a floor panel portion with a floor surface on which the feet of a seated occupant are placed. The floor surface is formed in the floor panel portion. In addition, a floor surface substantially flush with the above-mentioned floor surface is also formed between the tire housings of the front cover. That is, as the floor surface of the MUV vehicle as a whole, one floor surface is formed by assembling the front cover and the center cover and then connecting their respective floor surfaces together. See, for example, JP-Y No. H6-34213.

It is preferable that the above-mentioned front cover is integrally molded from resin in order to reduce the number of assembly man-hours. Further, since the feet of the occupant are placed on the floor surface of the center cover, it is preferable that a non-slip portion that protrudes in the vertical direction of the vehicle should be formed on the floor surface. However, since it is necessary to form the tire housing in the above-mentioned front cover, it is necessary to split the molding die for the front cover in the longitudinal direction of the vehicle. Thus, it has been difficult to form a non-slip portion that protrudes in the vertical direction of the vehicle in the floor surface between the tire housings of the front cover.

SUMMARY AND OBJECTS OF THE INVENTION

In view of the above, it is accordingly an object of an embodiment of the present invention to provide a body cover structure for a seat type vehicle which allows a non-slip portion to be formed integrally on the floor surface located between the tire housings.

According to an embodiment of the present invention, there is provided a body cover structure for a seat type vehicle in which a body cover made of resin covers a body frame that is split into a front cover, a center cover, and a rear cover. Tire housings are formed in the front cover, wherein a floor panel portion extending between the tire housings is formed integrally in the center cover. In addition, a non-slip portion is formed integrally on a floor surface of the floor panel portion.

According to this construction, the floor surface can be formed separately from the front cover, thereby making it possible to form a non-slip portion on the floor surface between the tire housings.

Further, a recess may be formed between the tire housings on the left and right of the front cover, the floor panel portion of the center cover being assembled onto the front cover in conformity with the shape of the recess.

According to this construction, the surface area of the floor panel portion can be enlarged.

Further, a footrest portion may be formed integrally on each of the tire housings of the front cover.

According to this construction, the molding die for the front cover can be split in the longitudinal direction of the vehicle, thereby making it possible to form the footrest portion integrally in the front cover.

According to the present invention, since the floor surface can be formed integrally with the center cover, by splitting the molding die for the center cover in the vertical direction of the vehicle, a non-slip portion can be formed on the floor surface located between the tire housings. Therefore, it is possible to reduce the risk of the feet of the driver or the like slipping on the floor surface. On the other hand, since the footrest portion is formed integrally in each of the tire housings of the front cover, there is no need to form the footrest portion as a separate component from the front cover, thereby allowing a reduction in manufacturing cost. Further, the footrest portion can be formed at a position higher than the floor surface of the center cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(*a*) and 11(*b*) are views showing a front cover alone, of which FIG. 11(*a*) is a side view, and FIG. 11(*b*) is a front view.

DETAILED DESCRIPTION OF THE PREFERRED EMBODIMENTS

A body cover structure for a seat type vehicle according to an embodiment of the present invention will now be described with reference to the drawings.

It should be noted that in this embodiment, a MUV (Multi Utility Vehicle) will be described as an example of the seat type vehicle. Further, in the following description, as for the up, down, front, and rear directions, the front side refers to the left-hand side as seen in FIG. 1, and the left and right directions refer to the directions as seen by the driver when seated in the occupant seat.

Figure 1:
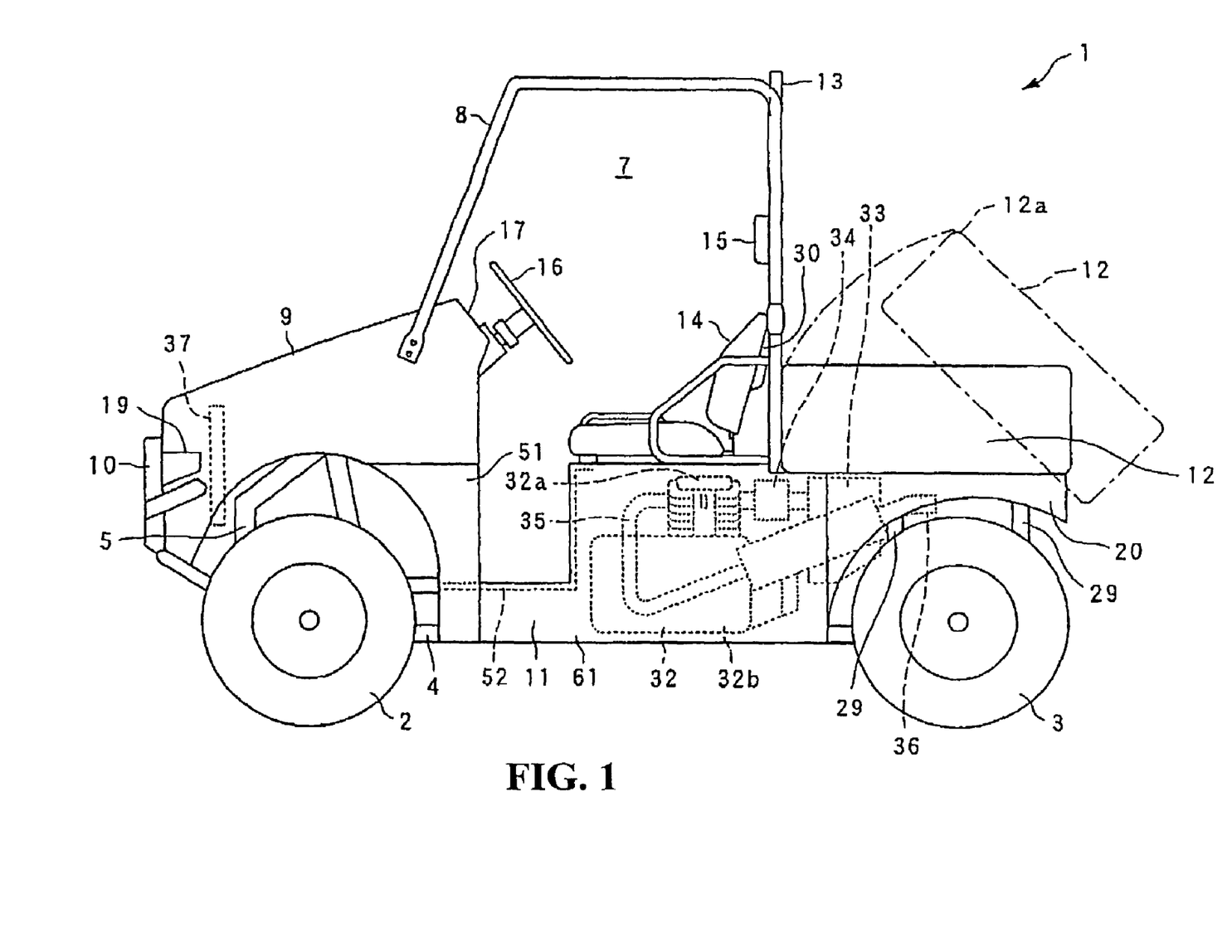
FIG. 1 is a side view of a vehicle equipped with a body cover structure for a vehicle according to an embodiment of the present invention.

As shown in FIG. 1, a MUV vehicle 1 is a four-wheel vehicle capable of driving over rough terrain or the like and having two front wheels 2 and two rear wheels 3 provided on the front and rear sides, respectively.

Figure 2:
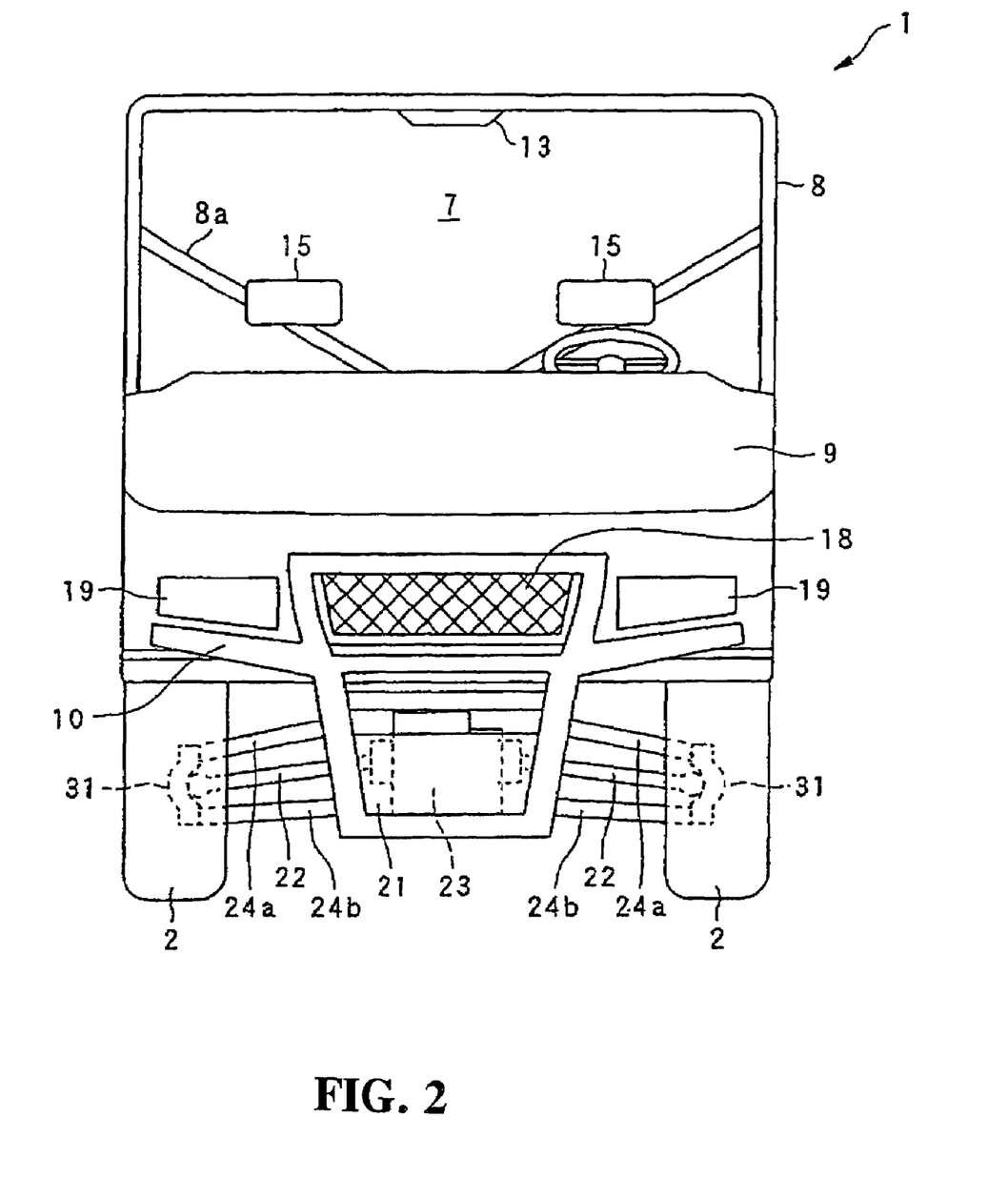
FIG. 2 is a front view of the vehicle shown in FIG. 1.

As shown in FIGS. 1 and 2, at the front portion of the vehicle 1, there are provided a bonnet 9 attached by means of a hinge or the like so as to freely open and close in the vertical direction with a front grille 18 for taking in air during the operation of the vehicle. A headlight 19 is arranged on either side of the front grille 18. A carrying pipe 10 is provided for protecting the front-side portion of the vehicle.

As shown in FIG. 2, as seen from the front side of the vehicle, the carrying pipe 10 is formed substantially in the shape of the number 8, and extends laterally from either side of the 8-shaped configuration to the portion below the headlight 19. The front grille 18 is exposed on the front surface of the vehicle through the opening in the upper side of the 8-shaped configuration of the carrying pipe 10. As shown in FIG. 1, arranged on the back side of the front grille 18 is a radiator 37 for cooling the cooling water with an air flow from the front grille 18.

Further, a skid plate 21 is provided in the opening in the lower side of the 8-shaped configuration so as to occupy the lower half of this opening. A front-wheel final reduction gear 23 is arranged on the back side of the skid plate 21. A drive shaft 22 for driving the front wheels 2 is coupled to the final reduction gear 23. Further, upper and lower suspension arms 24a, 24b are coupled to each of the front wheels 2 via a knuckle 31. The proximal end portions of the suspension arms 24a, 24b are attached to front frames 5 that will be described later in detail.

Figure 4:
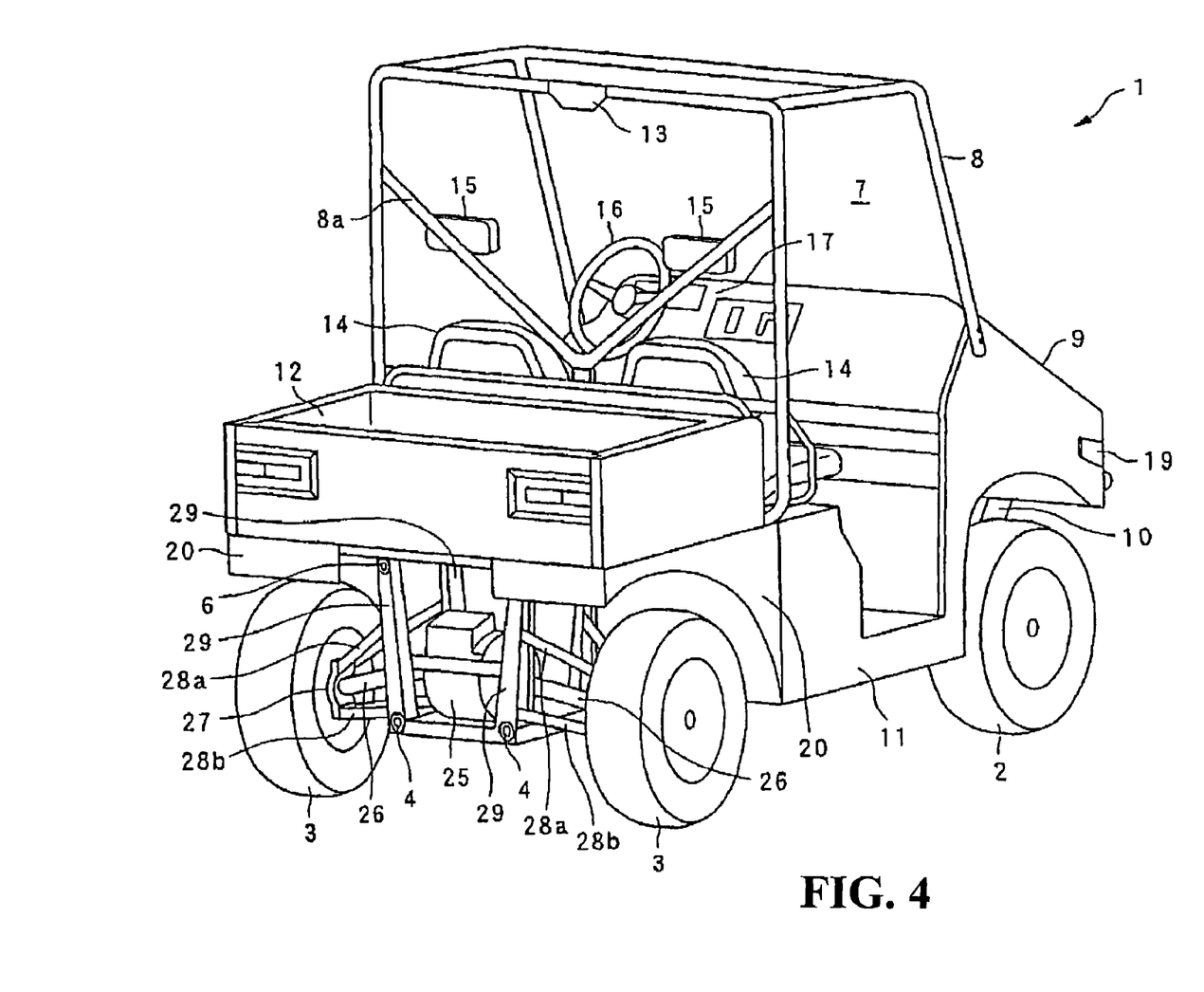
FIG. 4 is a perspective view, as seen diagonally from the right rear, of the vehicle shown in FIG. 1.

As shown in FIGS. 1 and 4, on either side portion of the vehicle 1, there are provided a body cover 11 that covers the side surface portion of the vehicle, and a fender 20 located on the vehicle rear side with respect to the vehicle cover 11. Further, the vehicle 1 is not provided with a door or the like. A cab 7 located above the body cover 11 is only surrounded by a roll bar 8 assembled using a frame member.

Figure 3:
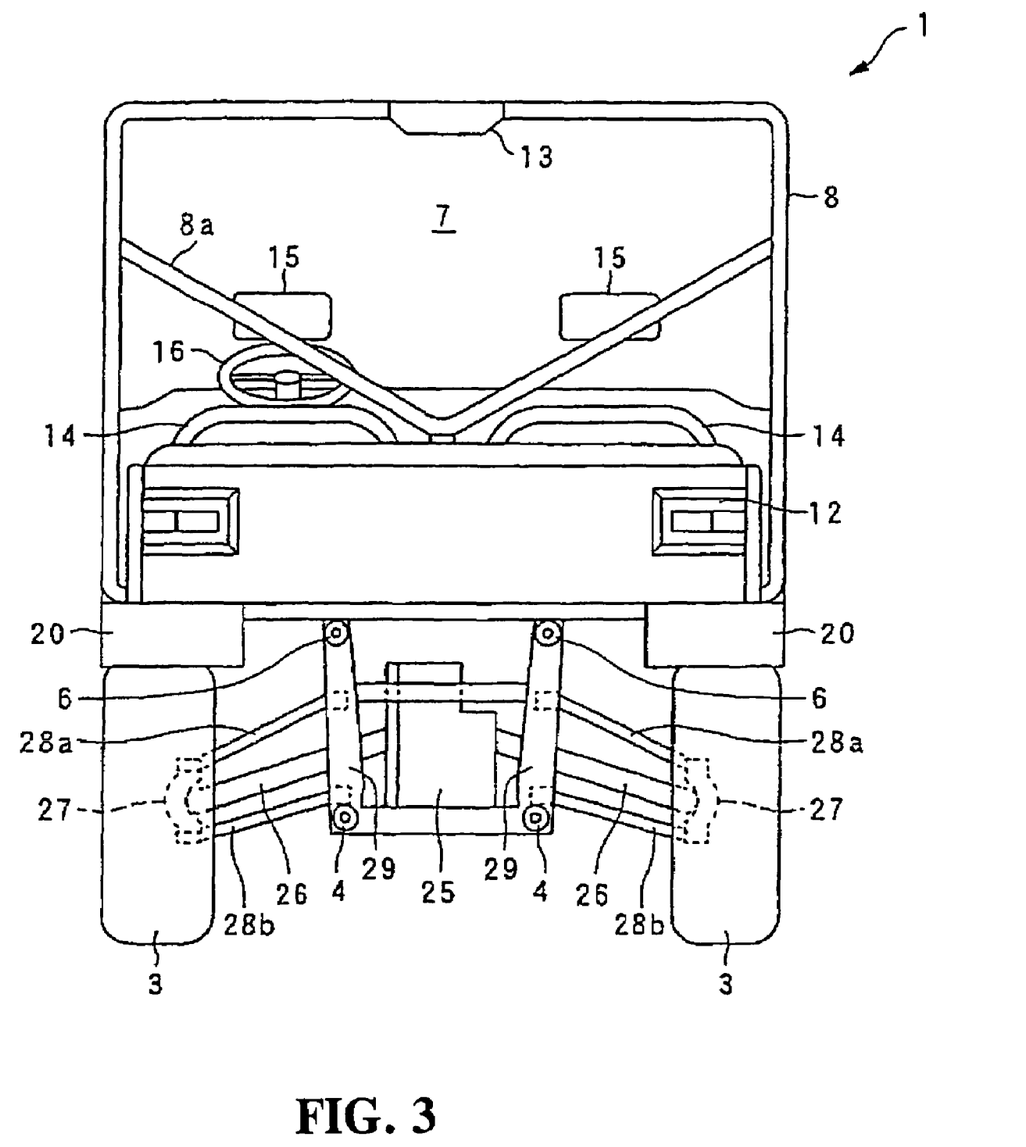
FIG. 3 is a rear view of the vehicle shown in FIG. 1.

As shown in FIGS. 1, 3, and 4, a load-carrying platform 12 for loading cargo is provided in the rear portion of the vehicle 1. The load-carrying platform 12 includes a rotary shaft (not shown) provided at a lower rear end portion. The front side portion of the load-carrying platform 12 can be lifted upwardly about the rotary shaft (see the load-carrying platform 12 indicated by the two-dot chain line in FIG. 1).

Further, in the rear portion of the vehicle 1, a rear-wheel final reduction gear 25 is arranged in the portion surrounded by lower frames 4 and upper frames 6 that will be described later in detail. A drive shaft 26 for driving the rear wheels 3 is coupled to the final reduction gear 25. Further, upper and lower suspension arms 28a, 28b are coupled to each of the rear wheels 3 via a knuckle 27. The proximal end portions of the suspension arms 28a, 28b are coupled to U-shaped brackets 29 vertically connecting between the lower frames 4 and the upper frames 6.

A stop lamp 13 that illuminates upon the actuation of the brake is mounted in an upper rear portion of the roll bar 8. The stop lamp 13 is positioned such that the mounting height of the stop lamp 13 is higher than the height of an upper end portion 12a of the load-carrying platform 12 at the time when the front side of the load-carrying platform 12 is lifted up. More specifically, the stop lamp 13 is placed at a position where it can be viewed from the rear of the vehicle 1 irrespective of the tilting state of the load-carrying platform 12.

The cab 7 is provided with two occupant seats 14 (which may be a bench seat as well) respectively arranged on the driver's seat side and on the passenger seat side, two headrests 15 arranged at positions above the occupant seats 14, a steering wheel 16 positioned in front of the driver's seat, and an instrument panel 17 that is located further frontward with respect to the steering wheel 16 for covering the front surface portion while extending over the driver's seat and the passenger seat. The occupant seats 14 are fixed to a seat frame 30 mounted above the upper frames 6 which will be described later. Further, the headrests 15 are mounted onto a reinforcing frame 8a extending in a substantially V-shaped configuration (see FIG. 3) from the roll bar 8.

As shown in FIG. 1, an engine 32 is provided below the cab 7. More specifically, the engine 32 is arranged below the intermediate position between the driver's seat and the passenger seat with respect to the vehicle width direction. The engine 32 mainly includes a cylinder head 32a and a crankcase 32b located below the cylinder head 32a, with an air cleaner 33 being disposed to the rear of the engine 32. The air cleaner 33 is connected to the rear side of the cylinder head 32a via a throttle body 34 (which may be a carburetor as well). Further, an exhaust pipe 35 is connected to the front side of the cylinder head 32a. The exhaust pipe 35 is drawn forward from the cylinder head 32a and then further routed downwardly toward the crankcase 32b side before extending diagonally upward toward the rear of the vehicle. A muffler 36, disposed in the rear of the vehicle, is connected to the exhaust pipe 35. Further, a crankshaft is arranged inside the crankcase 32b so as to extend in the longitudinal direction of the vehicle. A driving force is transmitted to the front wheels 2 by means of a drive shaft (not shown) that extends forward from the crankcase 32b. In addition, a driving force is also transmitted to the rear wheels 3 by means of a drive shaft (not shown) extending rearwardly from the crankcase 32b. Further, the engine 32 is connected via a piping (not shown) to the radiator 37 (see FIG. 1) provided on the front side of the vehicle.

Figure 5:
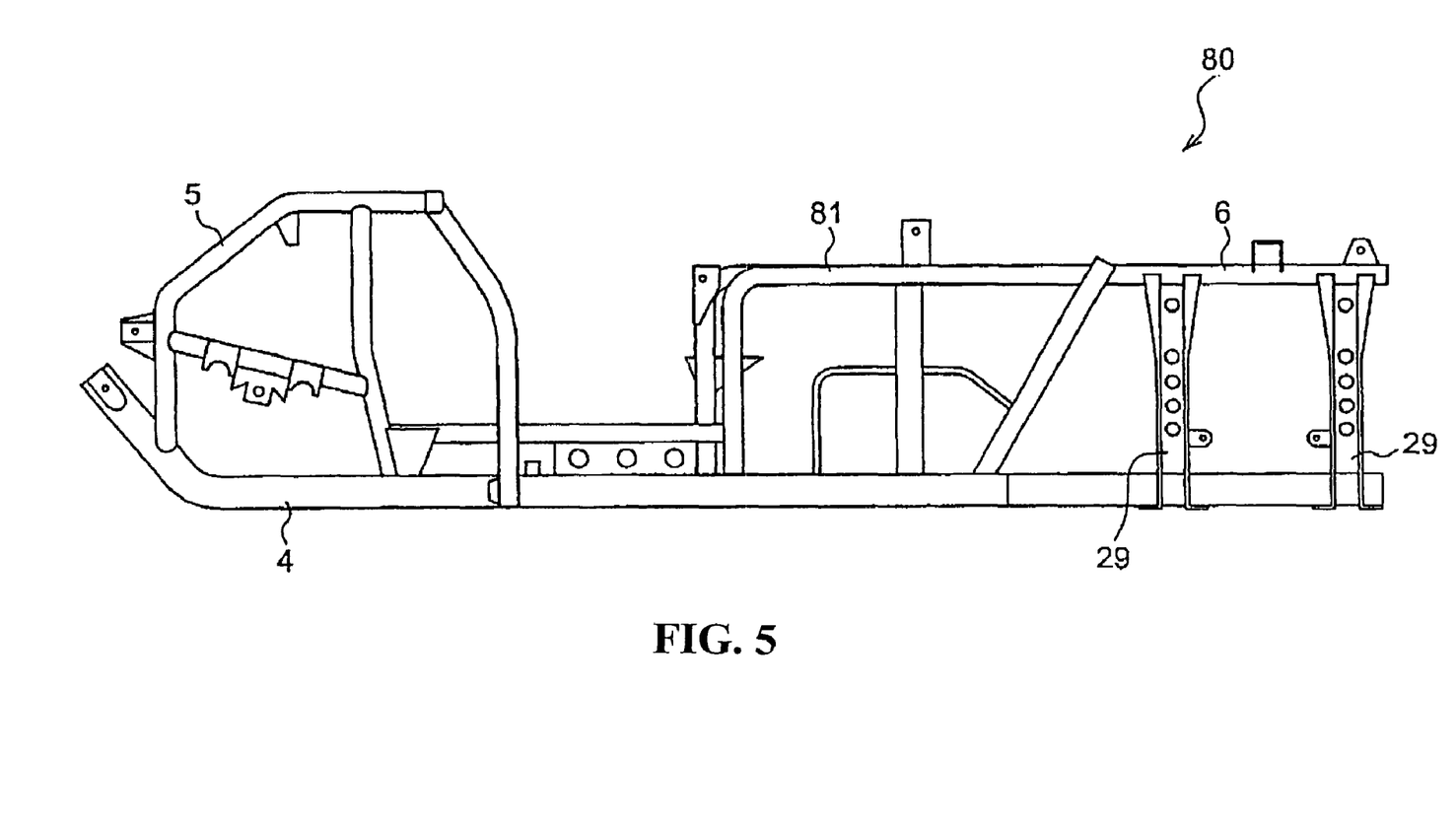
FIG. 5 is a side view showing the body frame structure of the vehicle shown in FIG. 1.
Figure 6:
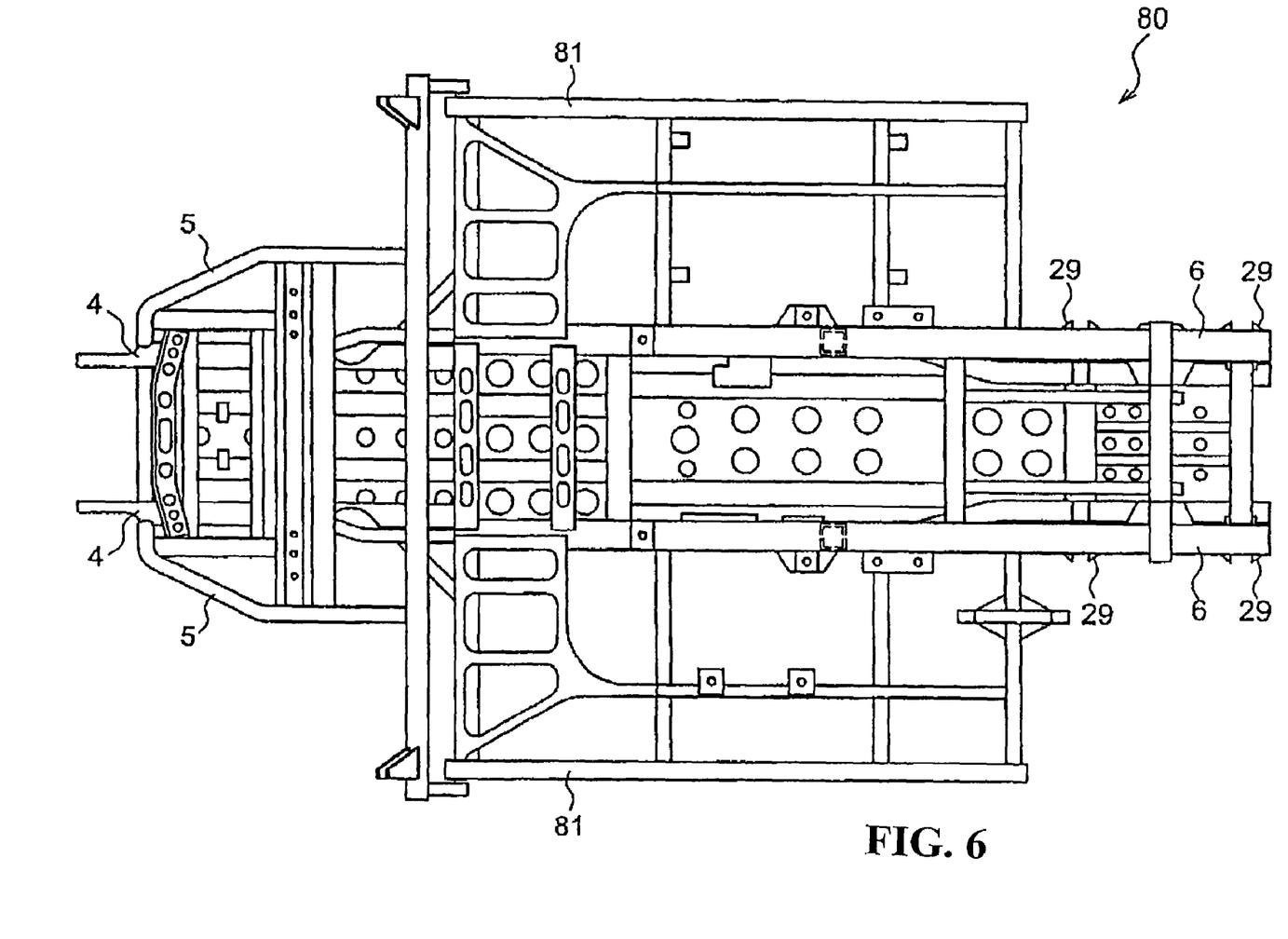
FIG. 6 is a plan view of FIG. 5.

FIG. 5 is a side view of a body frame as a strength member of the vehicle 1 as seen from the side portion of the vehicle (in the same direction as FIG. 1), and FIG. 6 is a plan view thereof.

A body frame 80 mainly includes the two longitudinally extending lower frames 4 at the bottom portion of the vehicle, the front frames 5 fixed to the lower frames 4 and constituting the front portion of the vehicle, the upper frames 6 located above the lower frames 4 so as to extend along the lower frames 4, and side frames 81 assembled by forming a plurality of frame members in a substantially lattice-like configuration on both side portions of the lower frames 4 and upper frames 6. The lower frames 4 and the upper frames 6 are integrally connected with each other by means of vertically extending frame members (such as the brackets 29).

Figure 7:
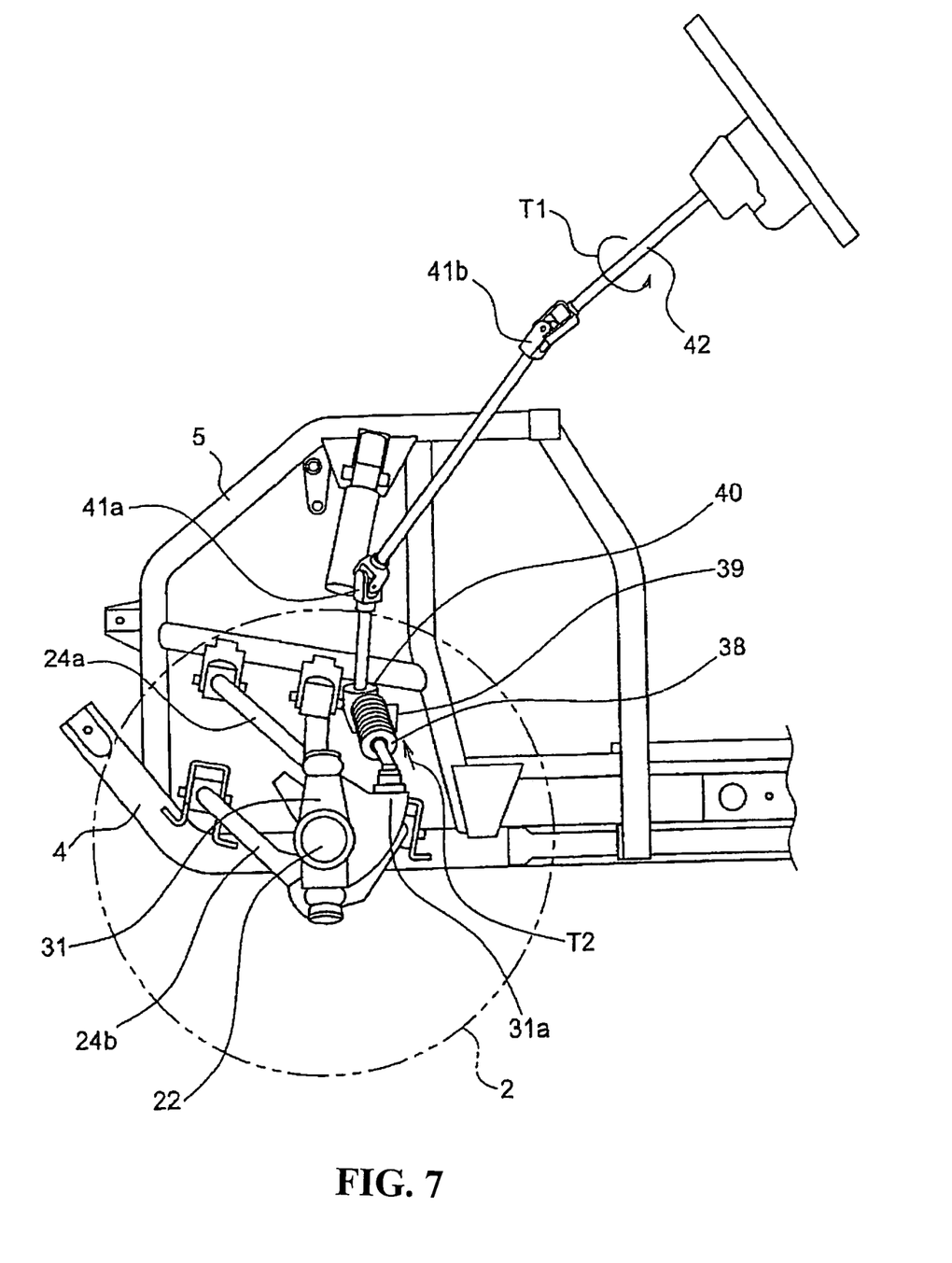
FIG. 7 is a schematic side view of a steering mechanism mounted to a front frame.

FIG. 7 is a schematic view of a steering mechanism provided in the front-side portion of the vehicle 1 as seen from the left side surface.

As shown in FIG. 2, arranged on the front side of the vehicle 1 are the upper and lower suspension arms 24a, 24b extending laterally to the sides of the vehicle 1 from the front frames 5, the knuckle 31 attached to each of the suspension arms 24a, 24b via a ball joint, and the front-wheel drive shaft 22 rotatably journalled to the knuckle 31 via a bearing. A steerage member 39 extends in the lateral direction of the vehicle and is coupled to the knuckle 31 via a tie rod 38. The front-side portion of the steerage member 39 is machined to form a rack gear, and a pinion gear 40 is in engagement with this rack gear of the steerage member 39. The pinion gear 40 is coupled to a steering shaft 42 via universal joints 41a, 41b. Due to the construction as described above, as the driver rotates the steering wheel 16 in the counterclockwise direction T1 (in the direction for making a left turn of the vehicle), for example, the steering shaft 42 and the universal joints 41a, 41b also rotate counterclockwise, causing the pinion gear 40 to also rotate counterclockwise. Thereafter, as the steerage member 39 moves in the direction T2 toward the rear side of the plane of FIG. 7, and the tie rod 38 pulls a rear portion 31a of the knuckle 31 for the left-side front wheel, the orientation of the left-side front wheel is changed to the left.

As shown in FIG. 7, the engagement position between the rack gear of the steerage member 39 and the pinion gear 40 is located on the vehicle rear side with respect to the front-wheel-side drive shaft 22 and within the height range between the upper suspension arm 24a and the lower suspension arm 24b. By bringing the rack and the pinion into engagement with each other at this position, the steerage member 39 can be arranged at a position in the lower side of the vehicle, thereby making it possible to lower the center of gravity of the vehicle 1. Further, by arranging the steerage member 39 at a position where it is protected by vehicle body components such as the front frames 5 and the suspension arms 24a, 24b, the steerage member 39 can be protected from obstacles during traveling of the vehicle.

Figure 8:
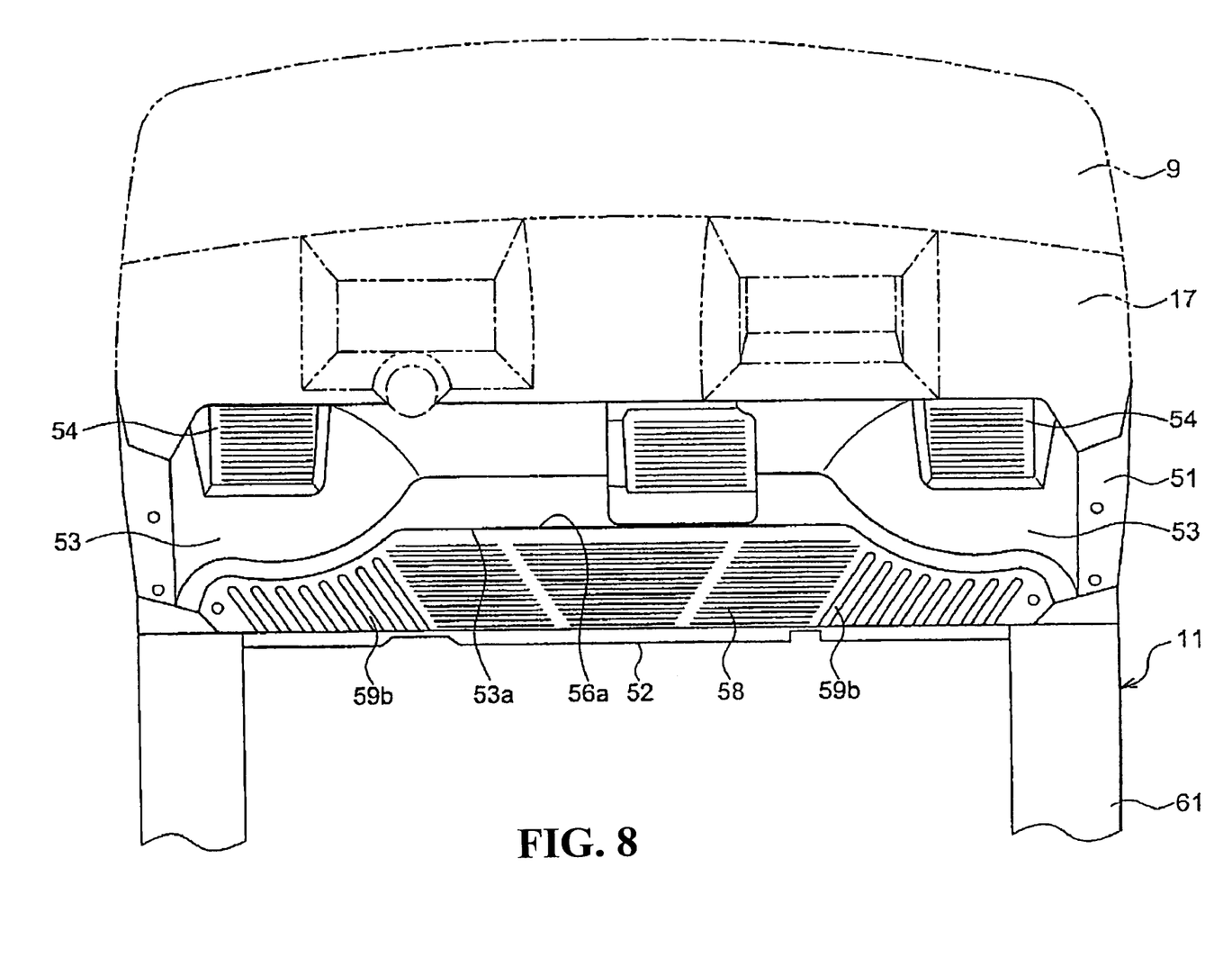
FIG. 8 is a bird's eye view showing the body cover structure according to the embodiment of the present invention.
Figure 9:
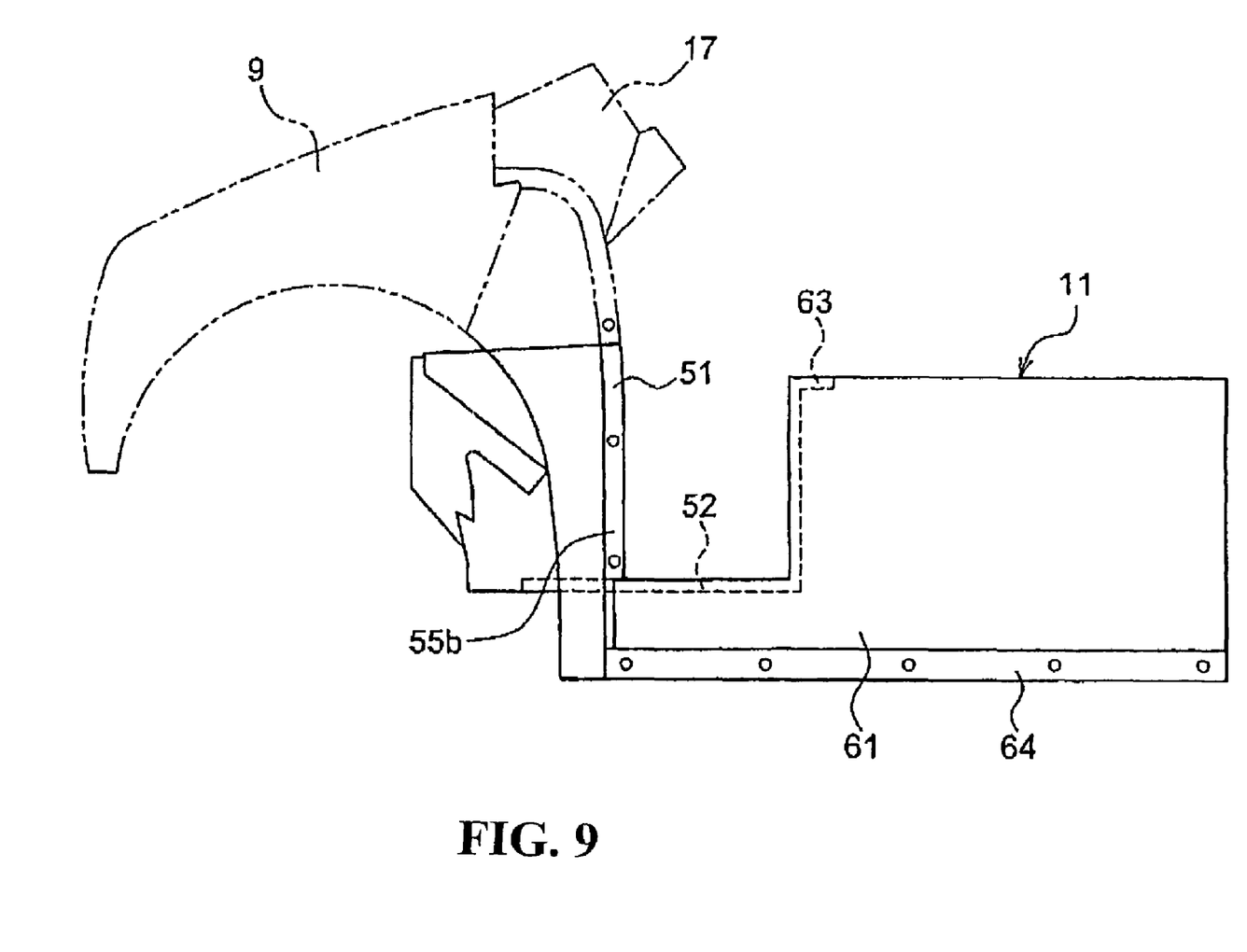
FIG. 9 is a side view of the body cover shown in FIG. 8.
Figure 10:
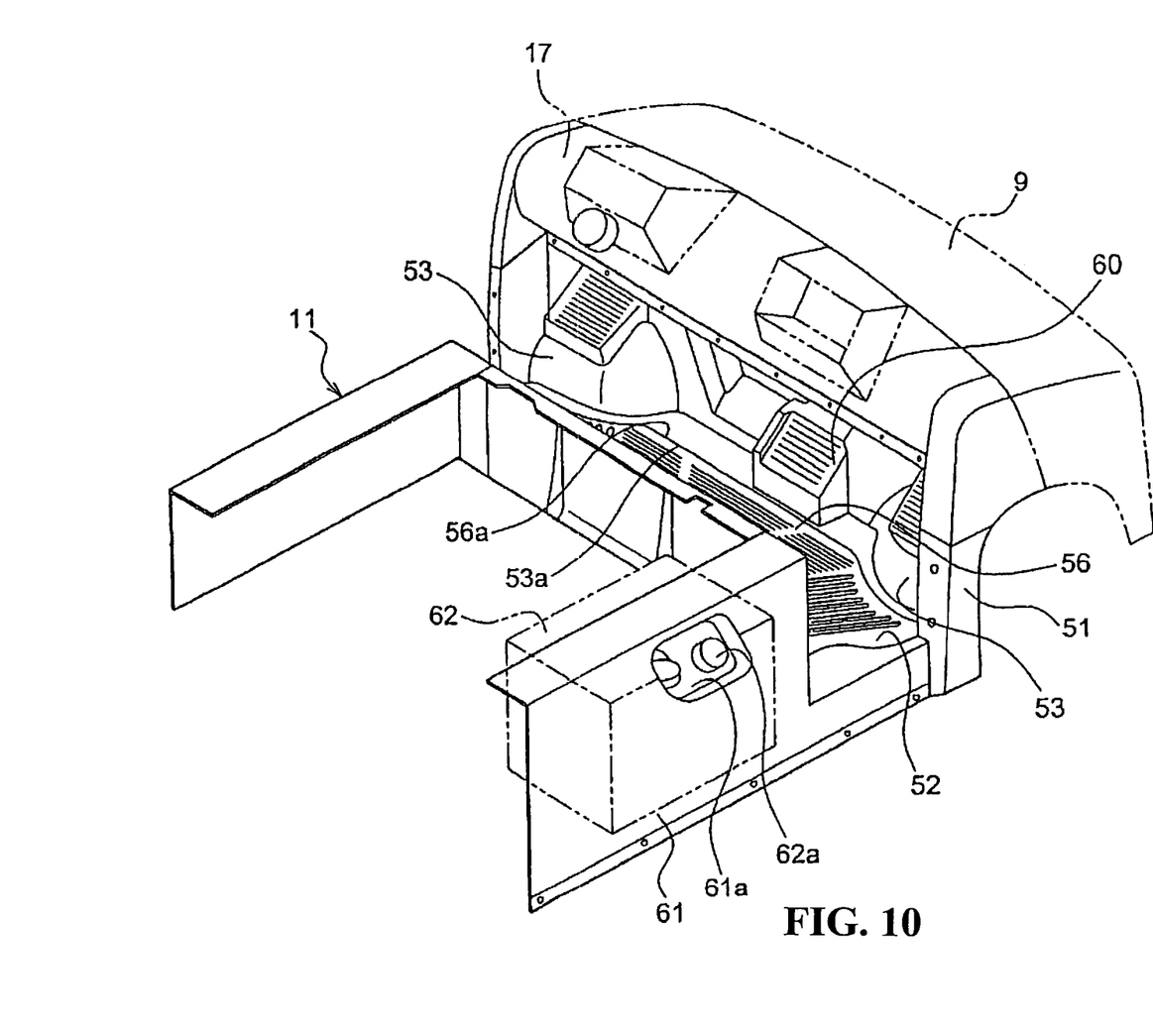
FIG. 10 is a perspective view of the body cover structure shown in each of FIGS. 8 and 9.

FIG. 8 is a bird's eye view of the body cover as seen from the upper side of the cab diagonally downwardly to the front side of the vehicle, FIG. 9 is a side view of the body cover shown in FIG. 8, and FIG. 10 is a perspective view of FIG. 9 as seen from the right rear.

As shown in FIG. 8, the instrument panel 17 onto which meters necessary for driving are assembled, and the body cover 11 located below the instrument panel 17 and constituting the periphery of the cab 7 are provided on the front portion of the cab 7. The body cover 11 is composed of a front cover 51, a center cover 52, and a rear cover 61. The covers 51, 52, 61 are each formed by integral molding using resin.

Figure 11A:
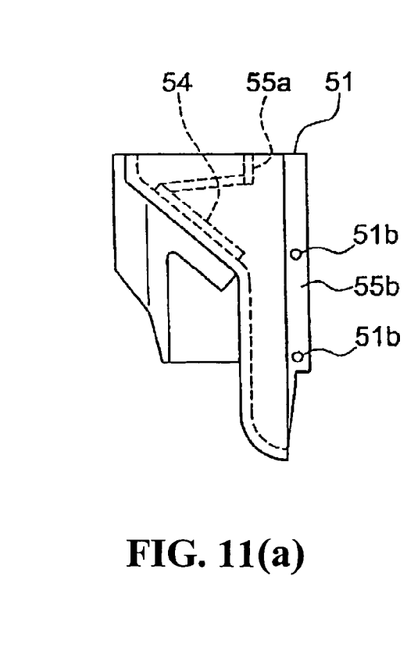
Figure 11B:
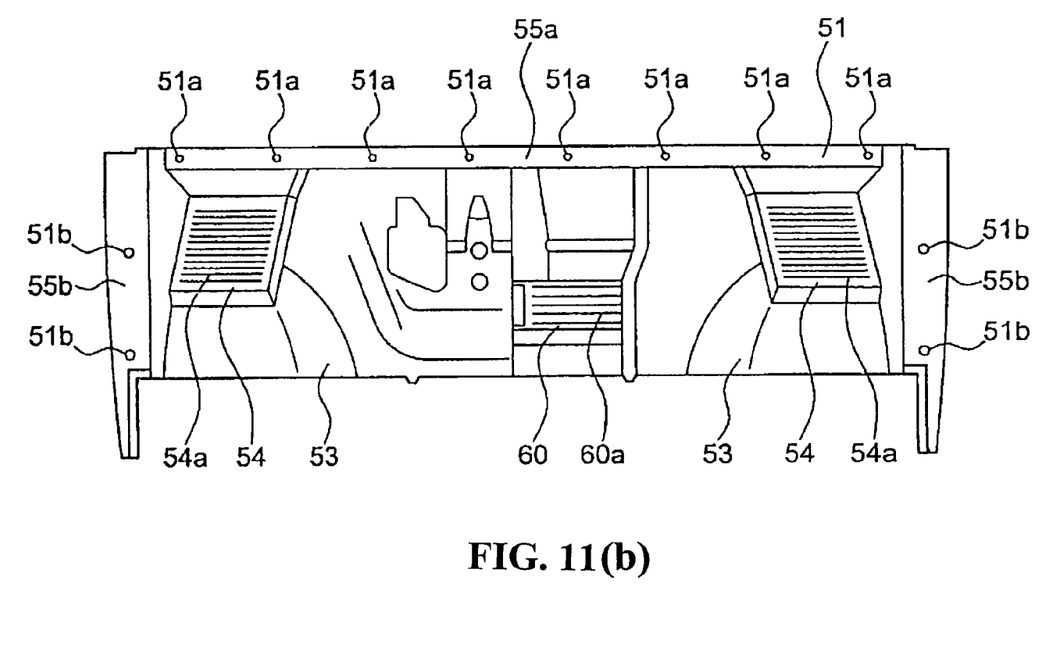
Figure 12:
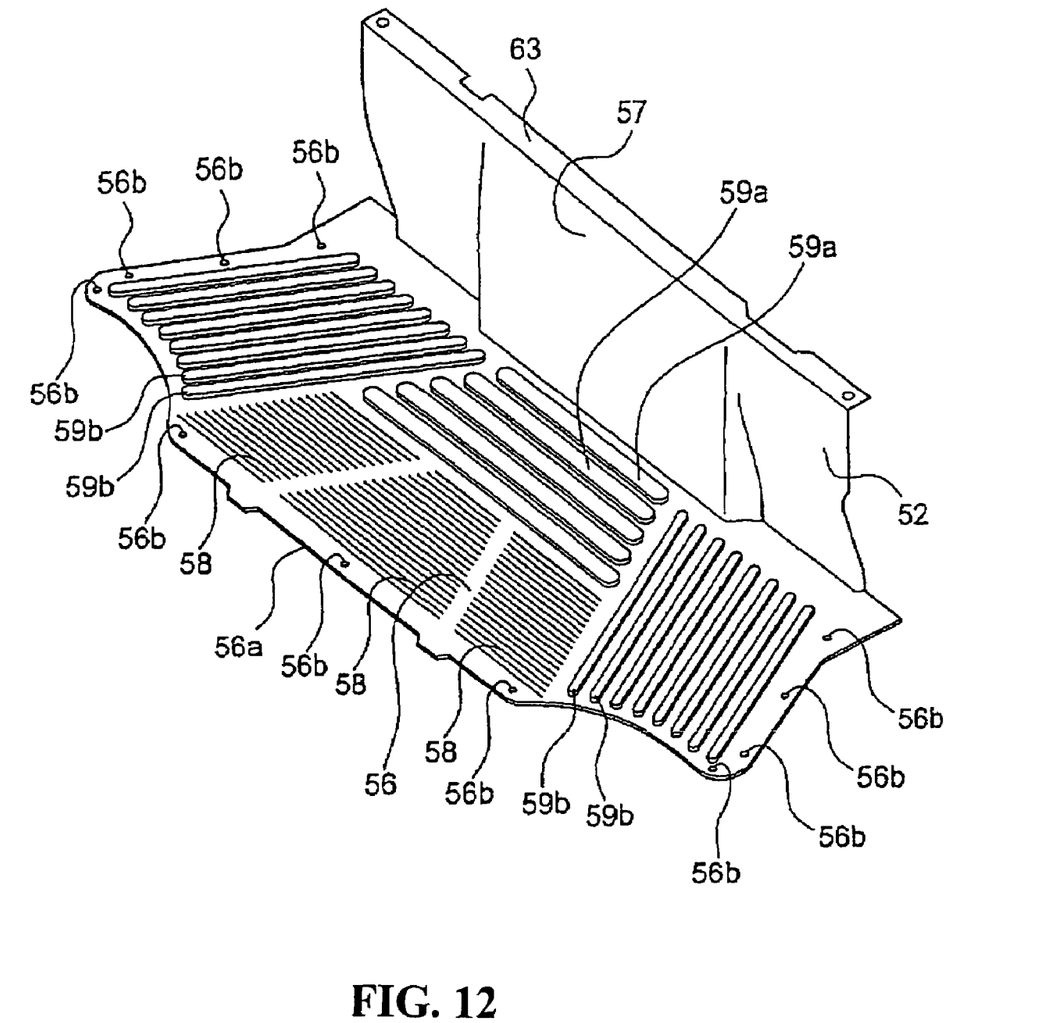
FIG. 12 is a perspective view showing a center cover alone.

FIGS. 11(a) and 11(b) are respectively a front view and a side view, each showing the front cover 51 constituting the body cover, and FIG. 12 is a perspective view showing the center cover 52 constituting the body cover.

As shown in FIGS. 11(a) and 11(b), the front cover 51 is generally recessed toward the front side of the vehicle. Tire housings 53 are respectively formed on both sides of this recessed portion. The tire housings 53 are shaped so as to project toward the cab side so that the front wheels 2 do not come into interference with the front cover 51 upon steering. A footrest portion 54, which is formed by a plane surface sloping from the front side of the vehicle diagonally downwardly to the rear, is provided in the upper surface of each of the tire housings 53. Grooves 54a extending in the lateral direction of the vehicle are formed as a non-slip portion in the plane surface of the footrest portion 54. A similar footrest portion 60 is also provided at the center portion in the width direction of the vehicle, and grooves 60a are formed in the plane surface of the footrest portion 60.

Further, as shown in FIGS. 8 and 10, a recess 53a for fitting engagement with a projection 56a of the center cover 62 which will be described later is formed in the portion of the front cover 51 between the tire housings 53.

On the other hand, an upper flange portion 55a for assembly onto the instrument panel 17, and side flange portions 55b for assembly onto the body frame 80 side, are formed in outer peripheral edges along the upper side and both left and right sides, respectively, of the front cover 51 in FIG. 11(b). Mounting holes 51a, 51b are provided in the upper flange portion 55a and the side flange portions 55b, respectively.

As shown in FIGS. 11(a) and 11(b), the tire housings 53, the footrest portions 54 and 60, the grooves 54a and 60a, and the like formed in the front cover 51 are formed so that they do not have any portions that protrude in the vertical and lateral directions of the vehicle. Accordingly, the die for integrally molding the front cover 51 can be formed by two parts split in the longitudinal direction of the vehicle.

As shown in FIG. 12, the center cover 52 has a substantially L-shaped cross section, and is composed of a floor panel portion 56 on which the feet of an occupant seated on the occupant seat are placed, and an upright wall portion 57 located on the rear side of the floor panel portion 56 and serves to regulate the rear position of the feet of the occupant.

The floor panel portion 56 is formed so that its surface is substantially parallel to the running surface when assembled onto the vehicle 1. Further, as shown in FIGS. 8 and 12, the central front-side portion of the floor panel portion 56 is provided with the projection 56a that projects toward the front of the vehicle relative to the portions on both sides thereof. Upon being assembled integrally with the front cover 51, the projection 56a comes into fitting engagement with the recess 53a of the front cover 51. Due to the projection 56a, the footrest plane (floor surface) between the left and right tire housings 53 is formed by the center cover 52.

Grooves 58 and protrusions 59a, 59b are formed as non-slip portions on the floor surface of the floor panel portion 56. The grooves 58 are formed on the central front-side portion with respect to the width direction of the vehicle, and each of the grooves 58 extend in the lateral direction of the vehicle. The protrusions 59a are formed in the central rear-side portion with respect to the width direction of the vehicle, and each of the protrusions 59a extends in the lateral direction of the vehicle. The protrusions 59b are formed on both left and right side portions with respect to the width direction of the vehicle, and each of the protrusions 59b extends diagonally forward from the central side of the vehicle to the outer side thereof. The grooves 58 and the protrusions 59a, 59b are formed in such a way that the protrusions 59a, 59b protrude and the grooves 58 are recessed in a direction substantially perpendicular to the plane of the floor panel portion 56, so that the molding die for the center cover 52 can be formed so as to be split in the vertical direction of the vehicle.

Further, a plurality of mounting holes 56b for mounting the center cover 52 onto the vehicle frame 80 side are provided in the outer peripheral edges of the floor panel portion 56.

The upright wall portion 57 forms a plane surface that extends upwardly from the rear-end edge of the floor panel portion 56. The upright wall portion 57 is positioned in a lower front-side portion of each of the occupant seats 14 (see FIG. 1). A flange portion 63 that is folded toward the rear of the vehicle is formed in the upper-end edge of the upright wall portion 57. Mounting onto the vehicle body frame 80 side is accomplished by using the flange portion 63.

As shown in FIGS. 9 and 10, the rear cover 61 is formed so as to cover the side portions of the center cover 52 and the lower side portions of the occupant seats 14. A flange portion 64 is formed in the lower side of the rear cover 61. The rear cover 61 is mounted onto the body frame 80 side by mounting bolts or the like to the flange portion 64 laterally from the sides of the vehicle. Further, as shown in FIG. 10, a recess 61*a* that is recessed with respect to the outer surface of the rear cover 61 is formed in an upper right side portion of the rear cover 61. A lid 62*a* of a fuel tank 62 is mounted so as to be exposed to the outer side of the vehicle 1 through the bottom surface of the recess 61*a*.

With the body cover structure for a seat type vehicle according to the embodiment of the present invention, the floor surface formed between the tire housings 53 can be molded integrally with the center cover 52. Accordingly, by splitting the molding die for the center cover 52 in the vertical direction of the vehicle, the grooves 58 and the protrusions 59*a*, 59*b* (non-slip portions) can be formed on the floor surface between the tire housings 53. Therefore, it is possible to reduce the risk of the feet of the driver or the like slipping on the floor surface. On the other hand, since the footrest portion 54 is formed integrally on each of the tire housings 53 of the floor cover 51, there is no need to form the foot rest portion 54 as a separate component from the front cover 51, thereby enabling a reduction in manufacturing cost. Further, the footrest portion 54 can be formed at a position higher than the floor surface of the center cover 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A body cover structure for a seat type vehicle in which a body cover made of resin for covering a body frame is split into separate pieces including a front cover, a center cover, and a rear cover, and tire housings are formed in the front cover, comprising:
   a floor panel portion extending between the tire housings, said floor panel portion being formed integrally in the center cover; and
   a non-slip portion being formed integrally on a floor surface of the floor panel portion,
   wherein the rear cover is formed so as to cover side portions of the center cover and lower side portions of an occupant seat.

2. The body cover structure for a seat type vehicle according to claim 1, wherein a recess is formed between the tire housings on the left and right of the front cover, and a projection of the floor panel portion of the center cover is assembled onto the front cover in conformity with the shape of the recess, wherein the projection extends laterally along a forward edge of the floor surface extending between the tire housings.

3. The body cover structure for a seat type vehicle according to claim 1, wherein a footrest portion is formed integrally on each of the tire housings of the front cover.

4. The body cover structure for a seat type vehicle according to claim 1, wherein the floor surface of the floor panel portion is substantially flat.

5. The body cover structure for a seat type vehicle according to claim 1, wherein the front cover includes an upper flange portion adapted to be attached to an instrument panel and a pair of side flanges adapted to be attached to body frame.

6. The body cover structure for a seat type vehicle according to claim 4, wherein the footrest portion is formed by a plane surface sloping from the front side of the vehicle diagonally downwardly towards a rear of the vehicle.

7. The body cover structure for a seat type vehicle according to claim 5, wherein the footrest portion is formed on an upper surface of each of the tire housings.

8. The body cover structure for a seat type vehicle according to claim 1, wherein the center cover includes the floor panel portion on which feet of an occupant are placed, an upright wall portion located on a rear side of the floor panel portion, and a flange portion at an upper-end edge of the upright wall portion which extends toward a rear of the vehicle.

9. The body cover structure for a seat type vehicle according to claim 1, wherein at least a part of the non-slip portion is formed by grooves extending in a lateral direction of the vehicle.

10. The body cover structure for a seat type vehicle according to claim 3, wherein the front cover includes another footrest portion that is centrally located between the footrest portions formed on each of the tire housings.

11. A body cover structure for use with a vehicle comprising:
    a body cover adapted to cover a body frame, said body cover having separate pieces including a front cover, a center cover, and a rear cover, and tire housings formed in the front cover;
    a floor panel portion extending between the tire housings, said floor panel portion being formed integrally in the center cover; and
    a non-slip portion being formed integrally on a floor surface of the floor panel portion,
    wherein the rear cover is formed so as to cover side portions of the center cover and lower side portions of an occupant seat.

12. The body cover structure for use with a vehicle according to claim 11, wherein a recess is formed between the tire housings on the left and right of the front cover, and a projection of the floor panel portion of the center cover is assembled onto the front cover in conformity with the shape of the recess, and
    wherein the projection extends laterally along a forward edge of the floor surface extending between the tire housings.

13. The body cover structure for use with a vehicle according to claim 11, wherein a footrest portion is formed integrally on each of the tire housings of the front cover.

14. The body cover structure for use with a vehicle according to claim 11,
    wherein the floor surface of the floor panel portion is substantially flat.

15. The body cover structure for use with a vehicle according to claim 13, wherein the front cover includes an upper flange portion adapted to be attached to an instrument panel and a pair of side flanges adapted to be attached to body frame.

16. The body cover structure for use with a vehicle according to claim 14, wherein the footrest portion is formed by a plane surface sloping from the front side of the vehicle diagonally downwardly towards a rear of the vehicle.

17. The body cover structure for use with a vehicle according to claim 15, wherein the footrest portion is formed on an upper surface of each of the tire housings.

18. The body cover structure for use with a vehicle according to claim 11, wherein the center cover includes the floor panel portion on which feet of an occupant are placed, an upright wall portion located on a rear side of the floor panel portion, and a flange portion at an upper-end edge of the upright wall portion which extends toward a rear of the vehicle.

19. The body cover structure for use with a vehicle according to claim 11, wherein at least a part of the non-slip portion is formed by grooves extending in a lateral direction of the vehicle.

20. The body cover structure for a seat type vehicle according to claim 3, wherein the front cover includes another footrest portion that is centrally located between the footrest portions formed on each of the tire housings.

* * * * *